United States Patent [19]

Fox

[11] 4,034,878
[45] July 12, 1977

[54] ELECTRIC HAND TRUCKS

[76] Inventor: Anthony Fox, 8306 Queen Ave. South, Minneapolis, Minn. 55431

[21] Appl. No.: 693,286

[22] Filed: June 7, 1976

[51] Int. Cl.$^2$ .......................................... B62B 1/06
[52] U.S. Cl. ................................ 214/374; 187/10; 214/517
[58] Field of Search .......... 214/370, 374, 515, 517; 187/9 R, 9 E, 10

[56] References Cited

U.S. PATENT DOCUMENTS

| | | | |
|---|---|---|---|
| 2,711,261 | 6/1955 | Butler | 214/517 |
| 3,907,138 | 9/1975 | Rhodes | 214/370 |

Primary Examiner—Robert G. Sheridan
Attorney, Agent, or Firm—Orrin M. Haugen

[57] ABSTRACT

A hand truck having elongated telescoping frame means for raising and lowering the load bearing flanged bed which is secured to the base portion and extends forwardly of the frame means. A pair of support wheels are mounted on opposite ends of an axle shaft for supporting the truck, and a screw shaft is mounted for rotation within the frame means for raising and lowering the respective segments of the telescoping frame means. Auxiliary carriage means are swingably mounted upon the base of the frame and have a pair of castors at the free end thereof, and bracket means are secured to the telescopically arranged frame at a certain elevation to form a generally triangular support for the frame with the auxiliary carriage. Winch means are coupled to the frame at a point between the location of the carriage bracket and the base, and means are provided for operating the winch means. A battery power source is provided, with a battery supporting cradle positioning the battery and cradle in the structure.

5 Claims, 10 Drawing Figures

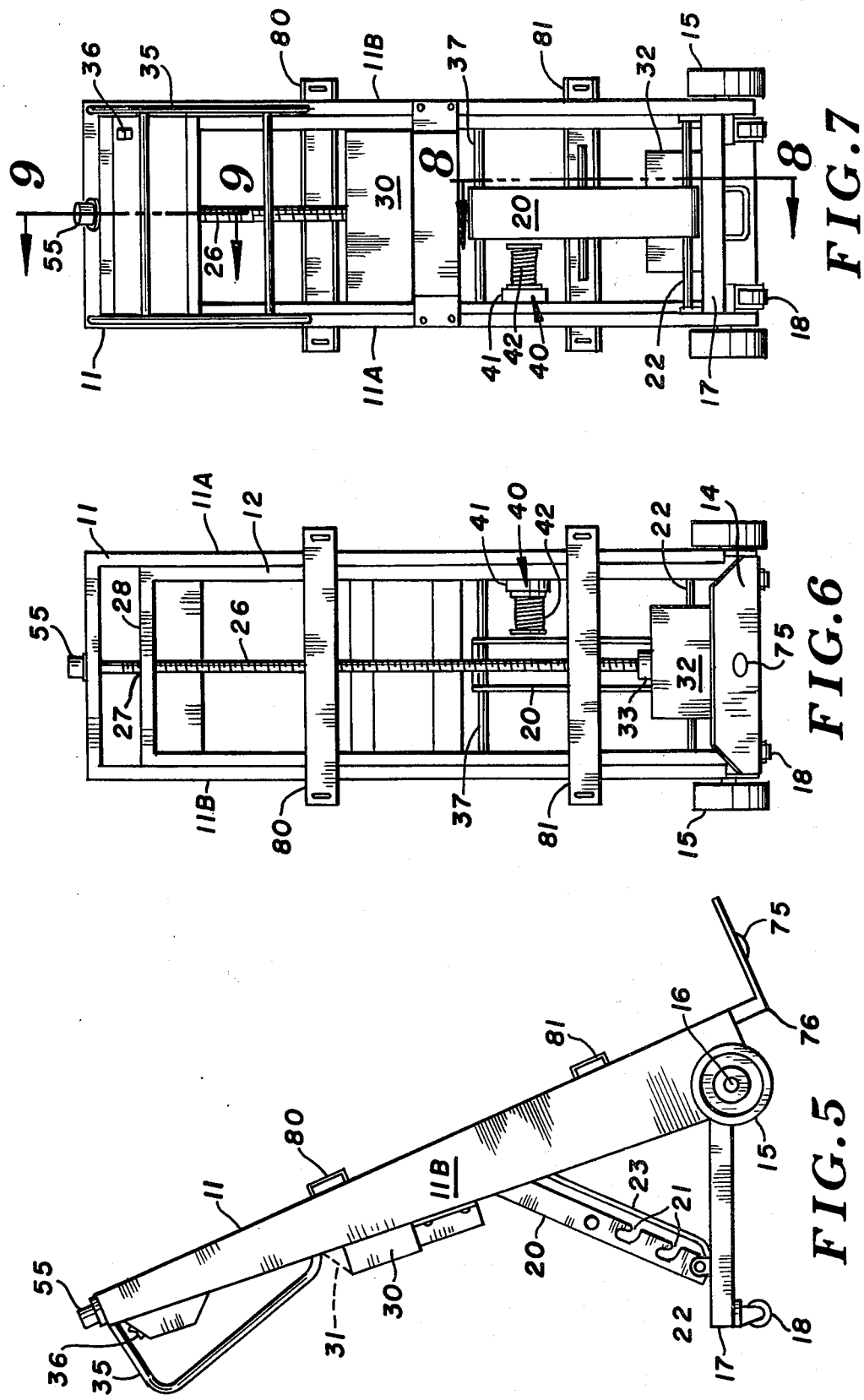

ELECTRIC HAND TRUCKS

BACKGROUND OF THE INVENTION

The present invention relates generally to a hand truck, and more specificaly to a hand truck having power control means for raising and lowering the load, and further having stabilizing carriage means which may be selectively utilized, as desired, along with winch means for assisting in moving the hand truck in response to the requirements of the individual operations.

In addition to the features described above, brake means are provided or resisting free rotation and otherwise controlling the rotation of the screw shaft which raises and lowers the laod frame carrying the load bearing flange. Thus, with the load in elevated position, it is possible to retain the load in its desired elevation without fear of having the load drop in response to gravity induced forces operating on the screw shaft causing rotation thereof.

In the past, various powered hand trucks have been employed with telescopically engaged frame members to permit raising and lowering a flange load bearing bed. Also, means have been provided for supplying battery power to these structures. The present device provides a substantial degree of stability during operation inasmuch as castor means are provided both forwardly and rearwardly of the main wheels in order to stabilize the device underload, and also to permit ease of maneuvering the load in tightly confined quarters.

It is a common feature of hand trucks that they become tilted both forwardly and rearwardly during use. For battery powered units, it is desirable to reduce if not eliminate any risk of spillage of battery fluids, such as sulfuric acid, from the battery due to tilting. In order to compensate for this tilting motion, battery supporting cradle means which may be, if desired, providing having upper trunnions which swingably support the cradle in generally upright position in response to tilting of the hand truck.

SUMMARY OF THE INVENTION

Therefore, it is primary object of the present invention to provide an improved hand truck which as a forwardly extending load flanged bed mounted upon a telescoping frame for ease of raising and lowering the flanged bed, with improved stabilizing means being provided to control the forwardly and rearwardly tilting of the hand truck while in use.

It is a further object of the present invention to provide an improved hand truck having means for winching the load, and with the means for winching the load being arranged to function without adversely affecting the stability of the loaded hand truck in generally upright disposition.

Other and further objects of the present invention will become apparent to those skilled in the art upon a study of the following specification, appended claims, and accompaning drawings.

BRIEF DESCRIPTION OF THE DRAWINGS

FIG. 5 a side elevation view of the hand truck of the present invention and illustrating the device with the load carrying flange in the downwardly extended disposition;

FIG. 6 a front view of the truck in the disposition illustrated in FIG. 5;

FIG. 7 a rear view of the hand truck illustrated in FIG. 5;

DESCRIPTION OF THE PREFERRED EMBODIMENT

Figure 1:
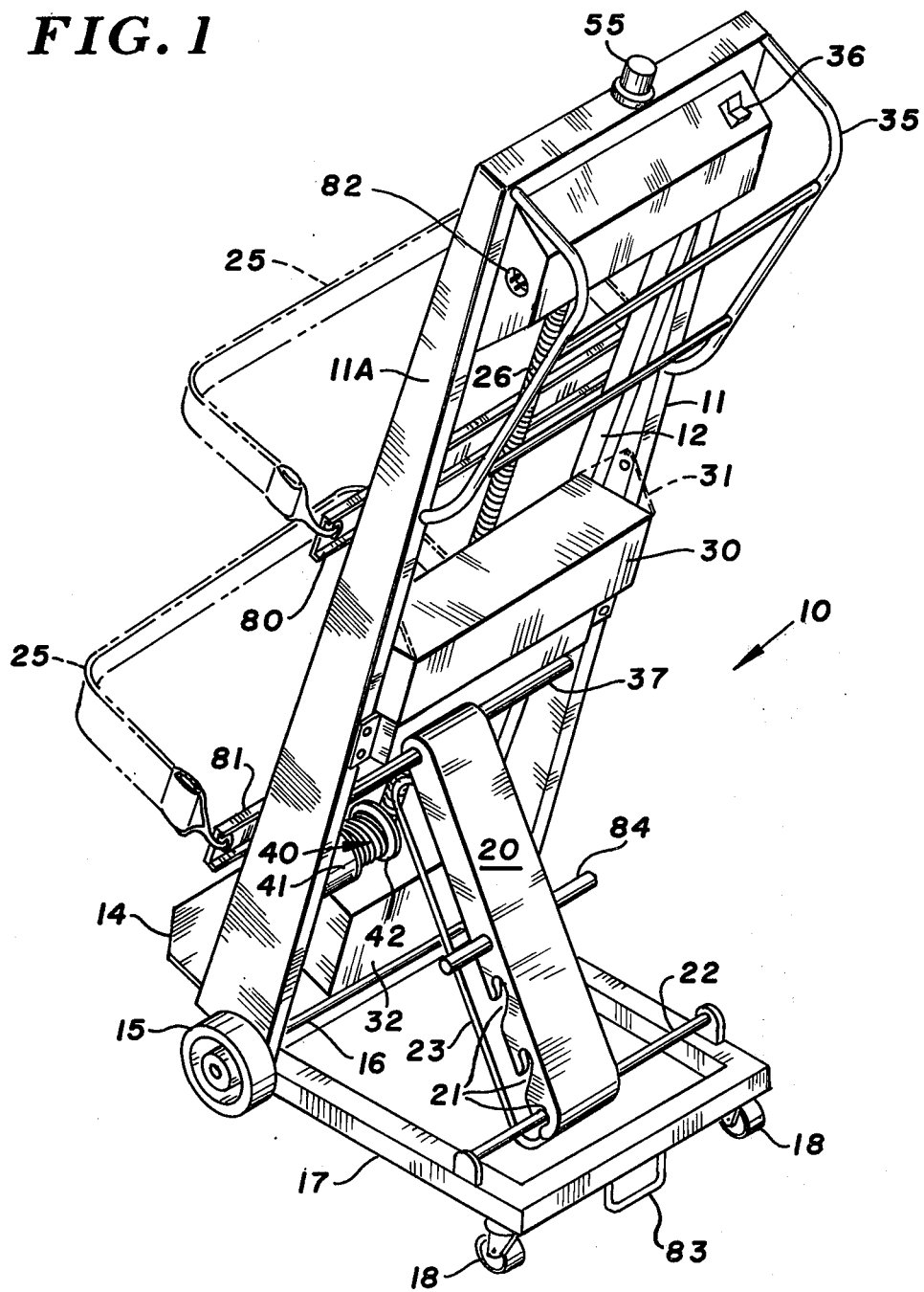
FIG. 1 is a side perspective view of a hand truck fabricated in accordance with the present invention.

In accordance with the preferred embodiment of the present invention, and with particular attenion being directed to FIG. 1 of the drawings, the hand truck generally designated 10 includes a structure having a first frame means shown at 11, along with a telescopically coupled second frame means 12 for accommodating raising and lowering of the load supporting flange 14. Load supporting flange 14 is secured across the vertical struts or members which form the second frame means 12, and is, accordingly, adapted to move or otherwise travel in respone to raising and lowering of the frame.

In order to support the load, a pair of opposed main wheels 15-15 are provided on opposed sides of axle shaft 16. In order to assist the operator during transporting of heavy loads, a stabilizing carriage frame or assembly 17 is provided having a pair of castors 18-18 secured to the underside thereof. Carriage 17 is a generally "U" shaped member pivotally joined or otherwise coupled to main frame 11 about the axle shaft 16. Pivotal movement of carriage 17 is possible in order to optionally use stabilizing carriage 17 or, if desired, pivot the assembly upwardly out of use in the zone disposed between the individual upright columns of the frame elements of frame means 11. For stability of the overall structure, a bracket means such as bracket 20 is pivotally secured to frame 11 along shaft 37, with bracket means 20 having slots formed therein as at 21-21 in order to receive support shaft 22 therein. Bracket assist handles 84 are also provided for lifting grips. As is apparent from FIG. 1, bracket means 20 is a channel member which, for purposes of simplicity, further carries rod element 23 to retain the bracket 20 appropriately in place. Those individual rod receiving areas 21-21 are spaced at spaced points along the length of bracket 20, and accordingly permit a variation in the angular dispositon of the frame means relative to the running surface.

Retractable belts are shown as at 25-25 in order to appropriately secure or otherwise clamp a load to the hand truck. Such retractable belts, are, of course, commerically available and are of the automobile type construction of, for example, woven nylon strap or the like. A ratchet and pawl system is utilized in order to lock the belts into place when a load is secured therealong.

As is apparent in FIG. 1, as well as FIGS. 6 and 7, load lifting screw 26 is provided which, upon rotation, engages ball-nut 27 which is secured in this embodiment, to the second telescopically engaged frame means 12. In this arrangement, cross-member 28 extends between the vertical posts or upright columns of frame means 12 and the captured ball-nut is disposed within the area illustrated at 27 in FIG. 1. Further attention and detail is given at FIGS. 6 and 7 wherein ball-nut 27 is shown in greater detail. Also, reference is made to FIG. 9 wherein a sectional view of the arrangement is shown.

With further attention being directed to FIG.1, a battery receiving cradle is illustrated at 30 secured to frame 11. In some instances, it may be desirable to have trunnion members as at 31-31 at the upper portion thereof for swingably supporting battery cradle 30 in proper upright disposition regardless of the disposition or elevaton of the main hand truck frame. A suitable battery or group of batteries of the lead-acid type will normally be employed for mounting in the cradle 30, with appropriate wiring being provided to the drive means.

Figure 8:
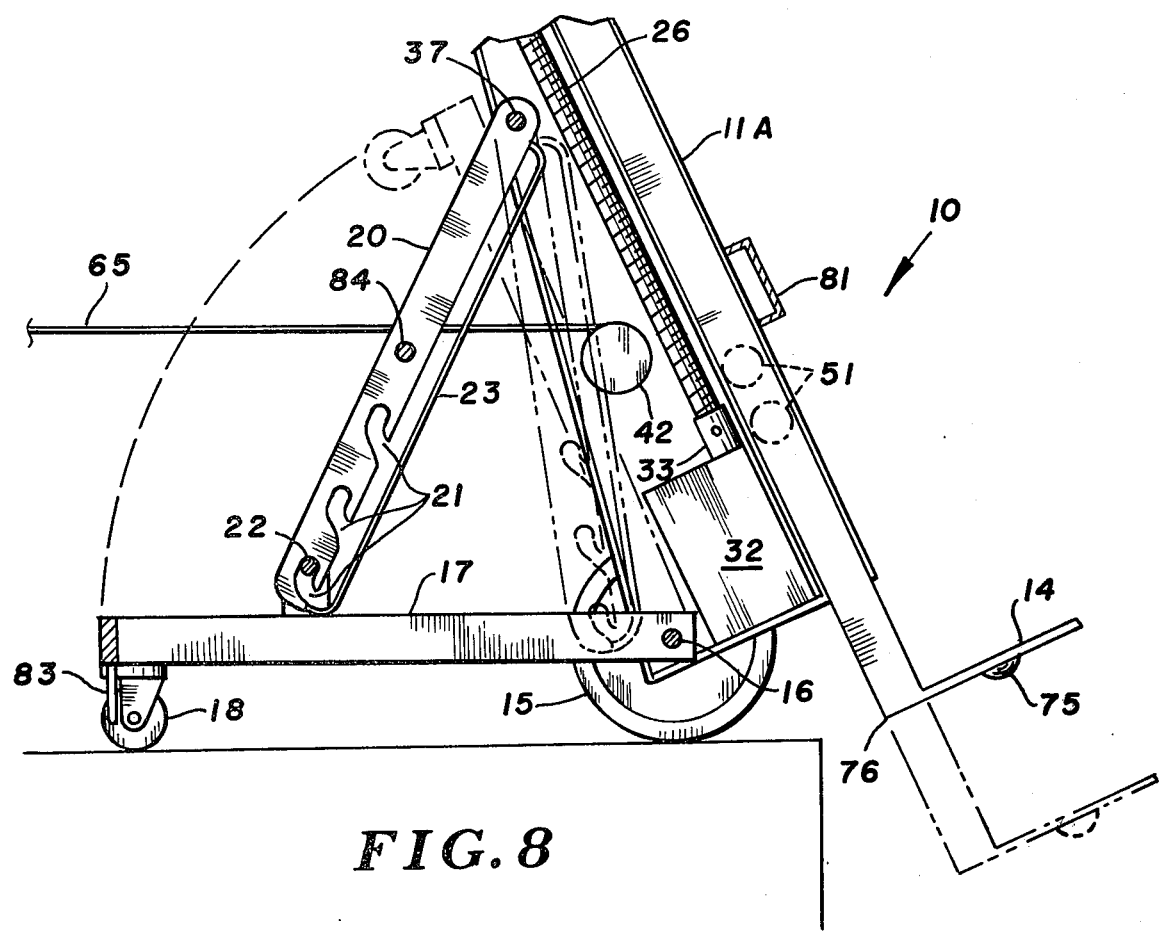
FIG. 8 a partial side elevational view, on a slightly enlarged scale, and illustrating the manner in which the stabilizing carriage assembly may be pivotally secured to the main frame means, and further illustrating the load extending featue which permits the telescoping frame members to extend or lower the load downwardly beneath the level of the main support wheels.

For most applications, a lifting screw motor will be provided, such as the lifting screw motor generally designated 32 and shown in some detail in FIG. 8. Again, these motors are conventional and provide a source of rotary motion to drive hollow output shaft 33 which is in the form of a screw receiving sleeve, and with load lifting screw 26 being secured for rotation with output drive sleeve 33.

With further attention being directed to FIG. 1 of the drawings, handles 35-35 are provided for the operator to handle the load as is conventional in hand trucks, with control switch 36 being provided adjacent the zone normaly occupied by the hands of the operator. For example, control switch 36 may be utilized to actuate or drive motor 32 in either direction which will cause the load supporting flange 14 to rise or be lowered.

Attention is now directed to FIGS. 6, 7 and 8 wherein the winch member or system is illustrated in some detail. Specifically, winch system generally designated 40 is provided having a winch motor 41 and a spool or drum 2 secured to the output shaft of winch motor 41. Winch 40 is, in turn, coupled or otherwise supported on the first frame means, that is the stationary frame means, and at an elevational disposition sufficient to be interposed generally between the axle shaft 16 and bracket support or pivot 21. Thus, upon application of force to the system by winch 40, there will be little, if any, tendancy to adversely affect the stability of the system, thereby permitting the operator to merely control or guide the movement without being overly concerned with the load becoming over-centered and thus crashing to the floor.

Figure 9:
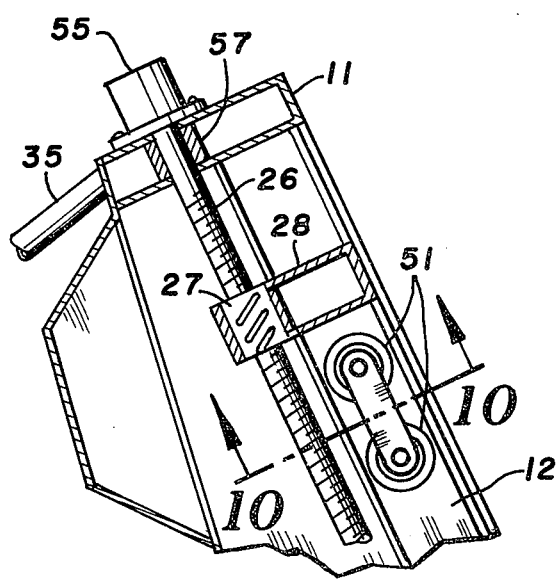
FIG. 9 is a detail side elevational view on a fragmentary portion of the structure and illustrating the manner in which the telescopically engaged frame members are secured together and further illustrating the support bearing for the screw shaft.
Figure 10:
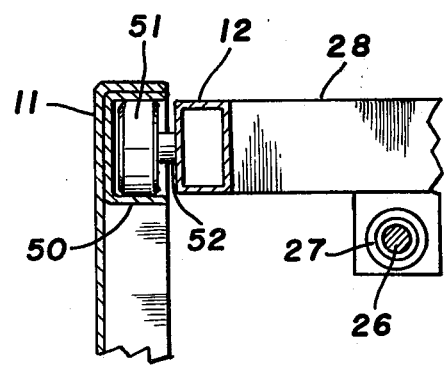
FIG. 10 is a sectional view taken along the line and in the direction of arrows 10—10 of FIG. 9.

Turning now to the details of the articulting motion existing between the telescopically engaged frame members 11 and 12, attention is directed primarily to FIGS. 8, 9 and 10 where this detail is best illustrated. In this connection, the first frame means 11 contains a channel member 50 which is utilized to receive wheel elments 51 which have their axle shafts 52 coupled or otherwie secured to the second frame mean 12, which, for purposes of this discussion, may be defined as a load-extender frame. The ball-nut means 27 is, as illustrated in FIG. 10, secured by means of weld or other suitable coupling-member 28 which extends between the individual upright posts or the like frame 12. Thus, a carefully defined motion is available between members 11 and 12, particularly by virtue of wheel receiving channel 50 which is, of course, welded or otherwise secured properly to the confines of frame 11. FIG. 9, for example, illustrates a side elevational sectional view of the arrangement of wheels 51 within channel 50. Accordingly, it will be observed that rectilinear to-and-fro motion is available between the individual telescoping frame members as illustrated:

With continued attention being directed to FIG. 9 of the drawings, it will be observed that frame 12 utilizins tandem wheels 51-51 in order to further stabilize the to-and-fro motion of the frame means 12 within frame 11.

In order to control the free wheeling motion of lift screw 26, a suitable braking element will be provided. Essentially, a spring-loaded unidirectional brake may be provided which will prevent free wheeling of the lift screw. Such unidirectional brake systems are, of course, commerically available, with the brake utilized in the structure being shown at 55, and particularly illustrated in FIGS. 1, 6 and 7. Generally speaking, the brake mechanism 55 employs a stack of alternately stationary and rotating disks, with spring means being provided to frictionally grip and engage the members as they move in the rotational direction corresponding to downward motion. Therefore, downward motion is more restrictive than is the upward motion, the mechanism is capable of driving the load in either direction without encountering any particular of specific problems during lifting or lowering.

Figure 2:
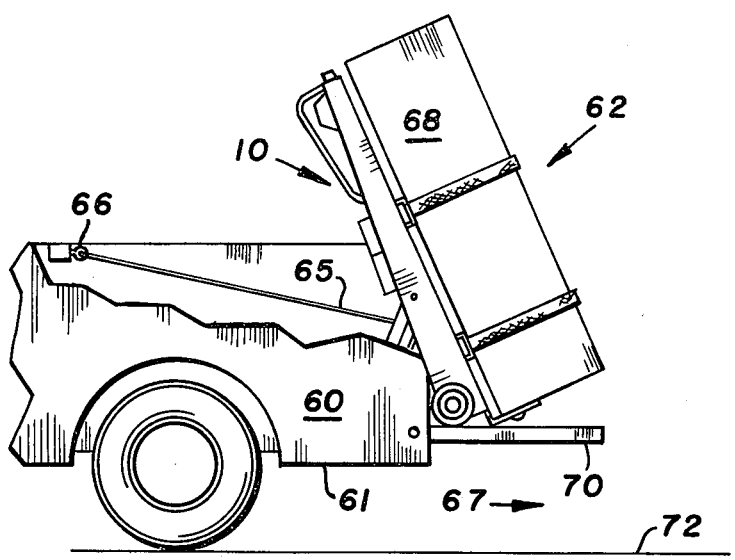
FIGS. 2, 3 and 4 are side elevational views illustrating the use of the hand truck in lowering a load from a self-propelled motor vehicle such as a pickup truck, with portions of the pickup truck being broken away to better illustrate the mechanism, and with FIG. 3 illustrating the load as after it has been dropped to the ground, and with FIG. 4 illustrating the disposition of the load on the truck following lowering of the truck to the ground level.
Figure 3:
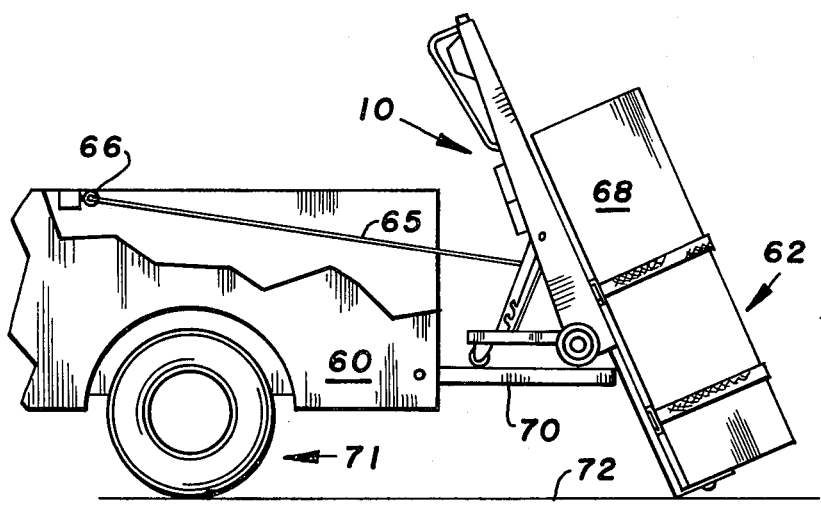
Figure 4:
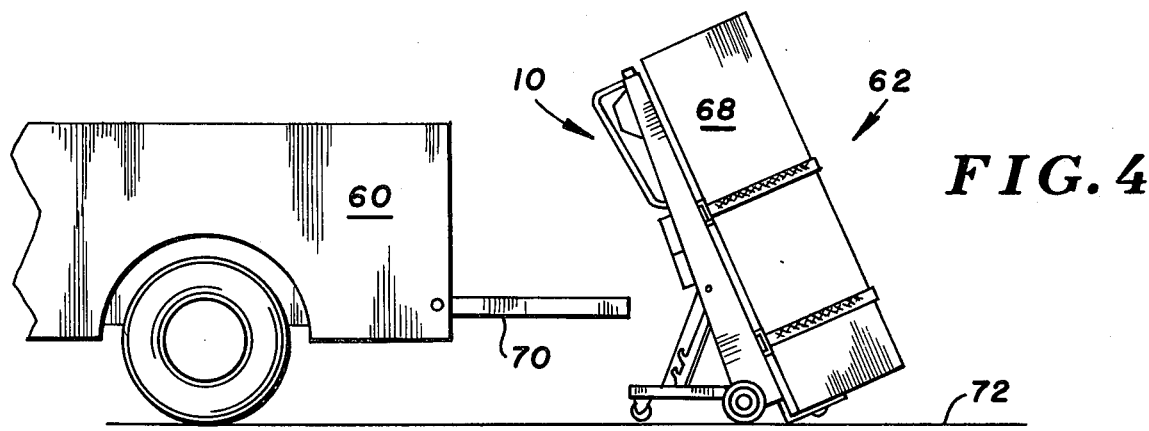

In order to permit controlled motion of shaft 26, a shaft end support bearing is provided as at 57, and best illustrated in FIG. 9. If desired, other support elements may be provided for shaft 26, it being understood, of course, that the length of travel of the load extender portion of the frame will be limited by virtue of the spacing of the free segments of shaft 26. It will be appreciated that the structure of the present invention may be utilized to transfer loads from varying elevational planes. FIG. 2, 3 and 4 illustrate a typical series for dropping a load by virtue of the load extender from the extender from the bed of a pickup truck to the ground. Specifically, in FIG. 2, pickup 60 having a box area as at 61 is loaded with a load generally designated 62 including, for example, a conventional household refrigerator 63 mounted on hand truck 10. Pickup box 61 is provided with conventional post receiving openings, and in the connection, a portable anchor bar in the form of a generally U" shaped rigid structure is mounted with the leg elements being received in the post receiving slots of the pickup box, and with the cross-member extending between the individual legs. A cable 65 is utilized to couple the winch of hand 10 to the portable anchor bar, particularly through the eyebolt 66. Cable 65 is permitted to play out at a controlled rate in order to control the movement to the right in FIG. 2, and illustrated by arrow 67 of load 62. Upon reaching substantially the end point of tail gate 70 of pickup 60, the winch cable 65 is locked in place and the operator activates the load extender mechanism for dropping the load from the disposition illusted in FIG. 2 to that illustrated in FIG. 3. Upon striking the surface of the ground, the operator may move pickup 60 forwardly in the direction of arrow 71 until the main portion of hand truck 10 is free of the end of the tail gate of pickup 60. Alternately, however, winch cable 65 may be further played out and the load moved generally vertically upwardly until the hand truck 10 clears the end of tail gate 70, thereby permitting the main portion of hand truck 10 to be lowered to the ground to the disposition illustrated in FIG. 4. Upon reaching the surface of the ground, as shown at 72, hand truck may be freed from the pickup 60 by disengaging winch cable 65 from portable anchor bar 66 and thus permitting the operator to further move the load along.

In order to further stabilize the load during forward tilting, a ball pivot is provided on the base of flange 14, such as at 75, and illustrated in particular at FIGS. 3, 4 and 5. With the load extender in the position illustrated in FIG. 5, any forward tipping of the entire truck about the angular line 76 will be permitted only the surface of ball pivot 75 makes contact with the supporting surface. This will assist the opertor and anyone else in the area from permitting the load such as a heavy household appliance as the refrigerator 63 from continuing to fall forwardly in a clockwise direction from the embodiment illustrated in FIG. 5.

As has been indicated, the retractable belts are employed in order to secure the load to the hand truck. These belts are illustrated in best detail in FIGS. 6 and 7 with a ratchet and pawl assembly being used. Also, as has been indicated, the structural features of the retractable belts are not unusual, and generally in accordance with the type of structure in wide use in the hand truck industry.

By way of additonal structural details, load support bars 80 and 81 are provided for retaining the belts 25-25, as illustrated in FIG. 1 for example.

For convenience in recharging of the battery, a recepticle 82 is provided which may receive current from a suitable battery charging source, either a conventional line voltage battery charger, or, in certain instances, charging power may be received directly from the alternator-charger of a conventional motor vehicle.

As has been indicated, axle shaft 16 for supporting the main wheels 15-15 is mounted in the first frame element 11 adjacent the base thereof. Bracket 20 is pivotally mounted about shaft 37 so as to pivot inwardly when it is desired to fold the stabilizer carriage system to an out of the way location. The bracket 20 is folded inwardly in a counter clockwise direction in the illustration of FIG. 8 until this member comes generally into alignment with the axis of frame means 11, whereupon stabilizing carriage 17 is folded upwardly in a clockwise direction until received within and between the vertical members 11a and 11b of frame 11. Also, as illustrated, belts 25-25 are secured in place to frame 11 by virtue of a secure mounting of members 80, 81, 82 and 83 unto elements 11a and 11b as required.

In the embodiments illustrated, winch motor 41 is illustrated as being mounted upon post 11b of frame 11. Normally, this mounting will be cantilevered in order to avoid interference between winch structure and bracket 20 and stabilizing carriage 17. For most purposes, therefore, winch motor 41 and winch drum 42 will be free from interference with the overall arrangement.

For materials of construction, conventional durable material such as steal will normally be employed. In certain instances, lighter weight can be achieved by utilizing certain aluminum-magnesium alloys in common use in industry today. Weight is considered relevant in the overall scheme, particularly since the operator will normally be lifting or otherwise handling the truck following unloading.

I claim:

1. In a hand truck, first frame means, a second frame means telescopically engaging said first frame means and having a load bearing flange bed extending forwardly thereof an axle shaft mounted on said first frame means and having a pair of wheels mounted at opposed ends thereof for supporting said hand truck, a screw shaft mounted for rotation on said first frame means and having a load bearing nut means in engagement with said screw shaft and being coupled to said second frame means for raising and lowering said second frame in response to rotation of said screw shaft, and electrically powered rotation means for providing power for rotation of said shaft;

a. auxiliary carriage means swingably mounted upon the base of said first frame means and having a pair of castors at the free end thereof mounted for rotatable support of said auxiliary carriage means, and bracket means secured to said first frame means at the first elevated location spaced from said axle shaft to form a triangular support for said first frame means;

b. winch means coupled to said first frame means and being mounted for rotation about shaft means, with said shaft means being coupled across said frame means generally parallel to said axle shaft and being disposed generally between said first elevated location and said axle shaft; and c. ball pivot means coupled to the base of said flange bed for supporting said band truck for movement upon forward tilting of said hand truck about the axis of said axle shaft.

2. The band truck as define in claim 1 being particularly characterized in that said winch means is secured in cantilevered fashion to said first frame means.

3. The hand truck as defined in claim 1 being particularly characterized in that means are provided for braking said screw shaft upon the application of forces tending to lower said second frame means, with said brake means being releasably coupled to said screw shaft.

4. The hand truck as defined in claim 1 being particularly characterized in that said auxiliary carriage means has a width less than the width of said first frame means for pivotal swinging motion of said auxiliary carriage means into the area between the generally vertical members of said first frame means.

5. The hand truck as defined in claim 1 being particularly characterized in that load engaging straps are provided at spaced locations about the lateral edges of said first frame means.

* * * * *

UNITED STATES PATENT OFFICE
CERTIFICATE OF CORRECTION

PATENT NO. : 4,034,878
DATED : July 12, 1977
INVENTOR(S) : Anthony Fox

It is certified that error appears in the above-identified patent and that said Letters Patent are hereby corrected as shown below:

Column 1, line 6, "specificaly" should read -- specifically --. Line 16, "laod" should read -- load --. Line 39, "providing" should read -- provided --. Line 45, after the word "is" insert -- a --. Line 46, "as" should read -- has --. Line 47, after the word "load" insert -- bearing --.

Column 2, line 7, after "FIG. 5" insert -- is --. Line 11, after "FIG. 6" insert -- is --. Line 13, after "FIG. 7" insert -- is --. Line 15, after "FIG. 8" insert -- is --. Line 19, "featue" should read -- feature --. Line 34, "attenion" should read -- attention --. Line 61, "therein" should read -- therewithin --.

Column 3, line 29, "elevaton" should read -- elevation --. Column 3, line 45, "the" should read -- that --. Line 46, "normaly" should read -- normally --. Line 49, after the word "or" insert -- to --. Line 55, "drum 2" should read -- drum 42 --. Line 60, after the word "support" insert -- shaft --.

Column 4, line 11, after the word "like" insert -- of --. Line 39, after the word "motion," insert -- however --. Line 41, "of" should read -- or --. Line 54, delete the words "the extender from". Line 64, after the word "crossmember" insert -- of the "U" shaped member --. Line 65, after the word "hand" insert -- truck --.

UNITED STATES PATENT OFFICE
CERTIFICATE OF CORRECTION

PATENT NO. : 4,034,878
DATED : July 12, 1977
INVENTOR(S) : Anthony Fox

It is certified that error appears in the above-identified patent and that said Letters Patent are hereby corrected as shown below:

Column 5, line 5, "illusted" should read -- illustrated --. Line 25, after the word "only" insert -- until --.

Column 6, line 30, after the word "frame" insert -- means --. Line 44, "band" should read -- hand --. Line 47, "band" should read -- hand --.

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*